Figure 1:
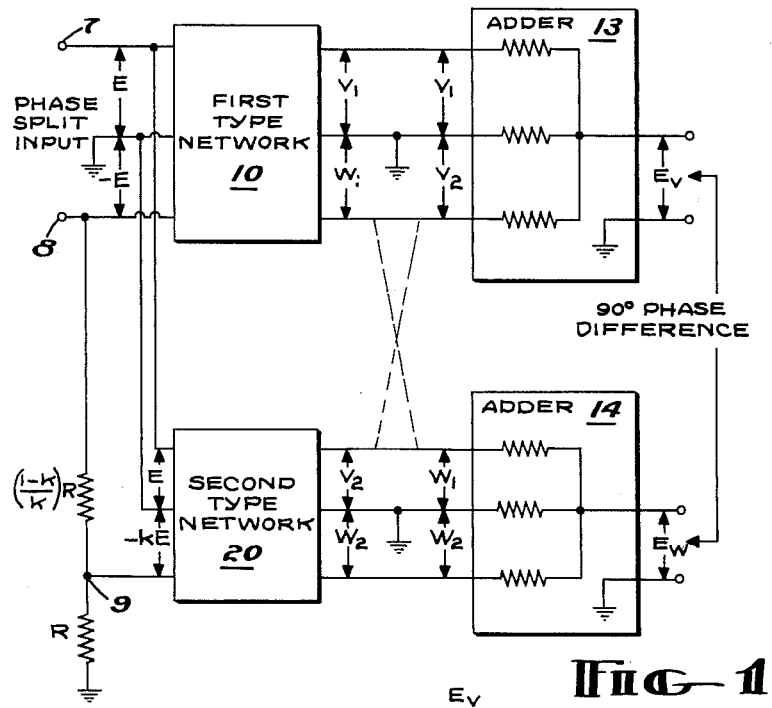

May 16, 1961

I. H. GERKS 2,984,799

BROADBAND-PHASE R.-C. NETWORK

Filed May 18, 1959

3 Sheets-Sheet 1

INVENTOR.
*IRVIN H. GERKS*
BY *Moody and Goldman*
ATTORNEYS

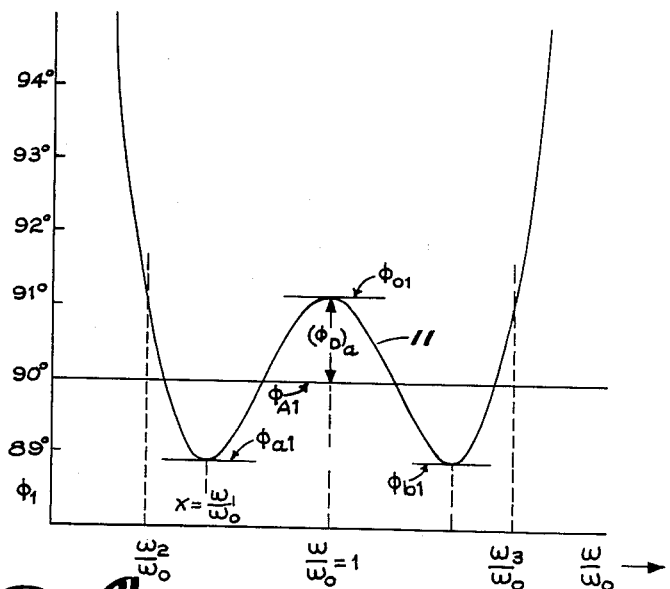
FIG-4
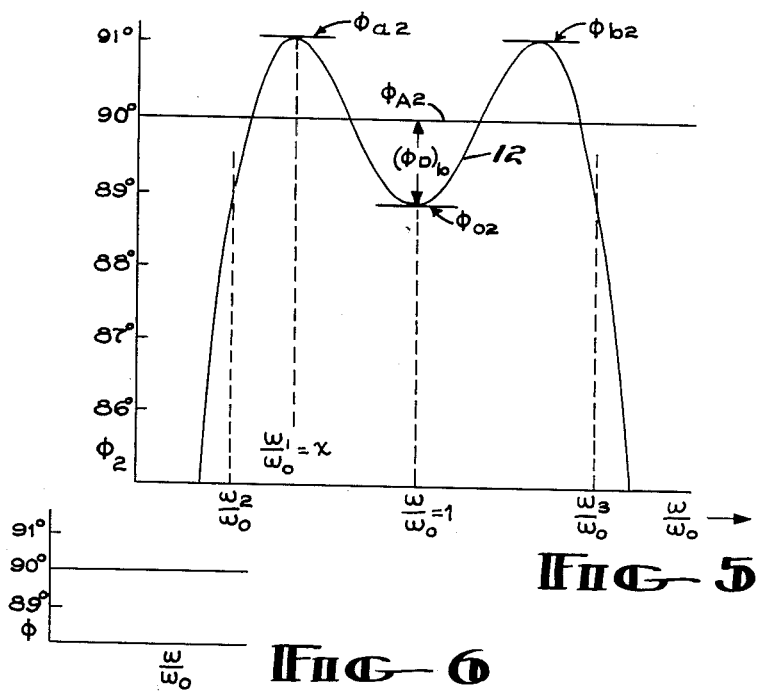
FIG-5
FIG-6

United States Patent Office 2,984,799
Patented May 16, 1961

2,984,799
BROADBAND-PHASE R.-C. NETWORK

Irvin H. Gerks, Cedar Rapids, Iowa, assignor to Collins Radio Company, Cedar Rapids, Iowa, a corporation of Iowa Filed May 18, 1959, Ser. No. 813,728

6 Claims. (Cl. 333—29)

This invention is related to a circuit capable of phase-shifting a signal within a broad frequency range by 90° without any tuning adjustment and without the use of inductive components. In particular, it is related to circuits which provide a pair of outputs, wherein a fixed 90 degree phase relationship is maintained between the outputs, although their frequency varies over a very large range, which may be of the order of many octaves.

Many types of phase-shift circuits are known in the prior art. Some are known which can provide a phase shift of 90° within moderate tolerances over a significant frequency range. However, none is known in the prior art which can obtain a phase shift fixed at 90° over a theoretically infinite range of frequencies. This can be obtained theoretically by the invention, although there is some variation in the relative amplitudes of its two outputs; in fact, the ratio of the two amplitudes approaches zero at the limits of an infinite frequency range. By the proper choice of parameters in the invention, equality of the two amplitudes can be maintained within close tolerances over a large frequency range. Also, the amplitude of each output is independent of frequency within similar close tolerances. When even small inequality of output amplitudes must be avoided, amplitude control means is available in the art which can maintain equality of amplitudes. For example, an automatic gain control system using amplitude comparators can be used to control relative amplitudes.

Many phase-shift circuits in the prior art which are capable of operating over moderate frequency ranges require inductive components. Inductive components are generally bulky, and necessary precision of winding inductances for such circuits makes their cost high.

It is therefore an object of this invention to provide a circuit which can theoretically maintain a fixed 90 degree phase relationship between two voltages derived from a single source over a theoretically infinite frequency range, while using only resistive and capacitive components.

It is another object of this invention to provide a broadband phase-shift network which can be economically constructed without the necessity for bulky and expensive inductive components.

It is another object of this invention to provide a wideband phase-shift circuit which can be used in:

(A) Phase-type single-sideband generators.
(B) Antenna arrays for obtaining a fixed pattern over a large frequency range.
(C) Wideband mixers for deriving a range of frequencies with relatively pure wave shape from a precision crystal oscillator.
(D) Wideband demodulators for suppressing image response in single-conversion superheterodyne receivers.
(E) Multi-phase power supplies for driving alternating-current motors over a wide range of frequency.
(F) Applications wherein the 90 degree phase relation between two signals established in a servo-loop with the aid of a phase detector must be neutralized to permit adding the signals.

(G) Instrumental applications typified by a circuit for generating a circular sweep on an oscilloscope screen over a wide range of frequencies.

The present invention uses as components a pair of relatively narrow-band phase-shift circuits found in the prior art. The first type of prior phase-shift network is disclosed in "Electronics," December 1946, page 112, Figure 1 (C). The second type of prior network is disclosed in "The Radio Amateur's Handbook" of the Amateur Radio Relay League, thirty-fifth edition, pp. 310-311, Figures 11-5 and 11-6. Neither of these prior phase-shift circuits can theoretically obtain a fixed 90 degree phase shift over even a small frequency range. That is, the phase shift will vary theoretically to some extent over any frequency range however small, although the phase variations can be maintained in practice within preassigned tolerances over a moderate frequency range, such as approximately $\pm 1°$ over a 10-to-1 frequency range.

The invention teaches how these imperfect prior circuits may be combined in a unique manner to provide a circuit which can provide a fixed 90 degree phase shift which theoretically can be maintained over an indefinitely wide frequency range.

Figure 2:
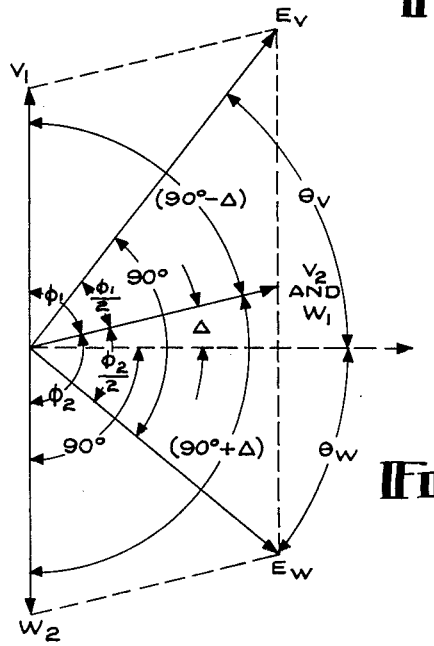
Figure 3:
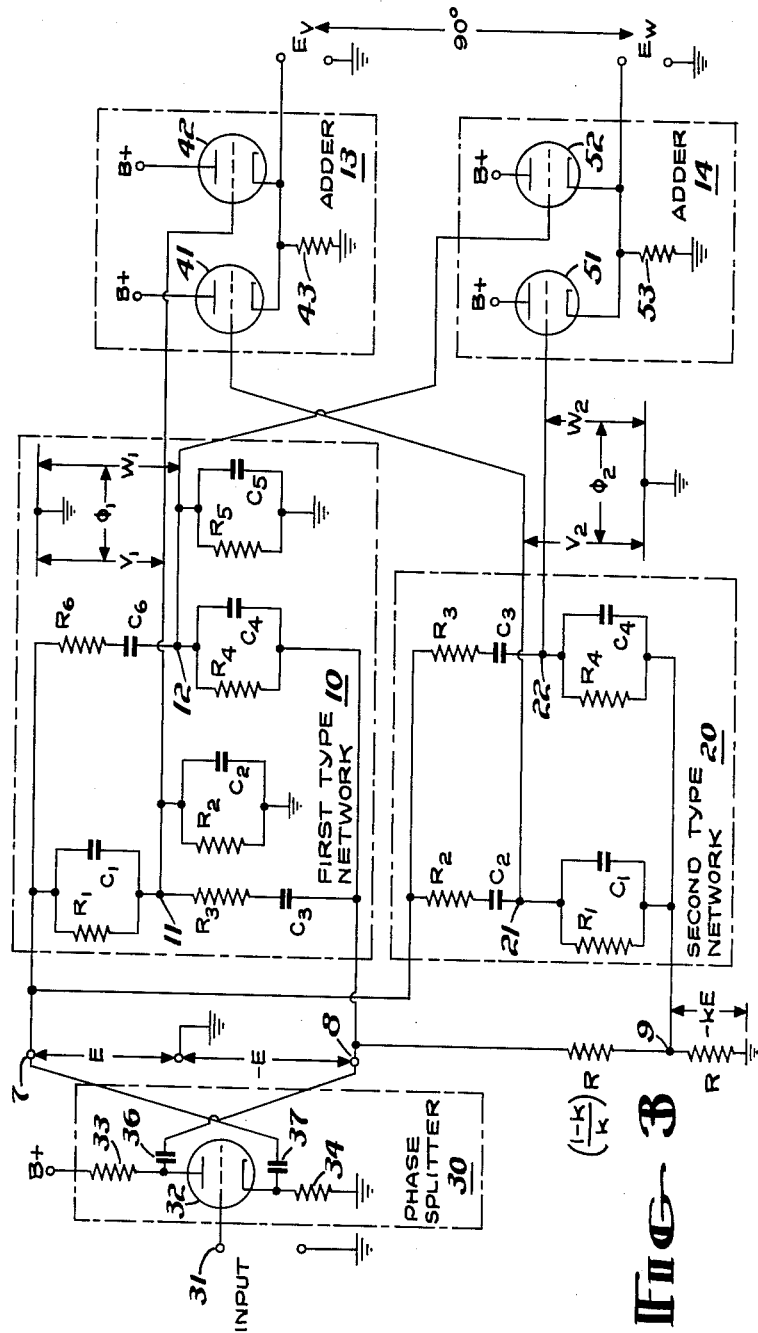

Further objects, features, and advantages of this invention will become apparent to a person skilled in the art upon further study of the specification and the accompanying drawings, in which:

Figure 1 represents a general diagram of the invention;
Figure 2 illustrates the vectorial voltage combinations found in the invention to obtain its output voltages;
Figure 3 shows a schematic of component circuits used in the invention;
Figures 4 and 5 illustrate phase fluctuation with frequency change found in prior networks used as component parts of the invention; and
Figure 6 illustrates the constant phase with frequency variation found with the invention.

Reference should be made to the drawings for a more detailed explanation of the invention. Figure 1 is first considered. It includes a first type of network 10 which has components connected in the manner given by the previously-cited reference in "Electronics." Further, it includes a second type of network 20, which has components connected in the manner found in the previously-named citation in "The Radio Amateur's Handbook."

A general application of the prior circuits providing networks 10 and 20 as taught in the cited references will not provide the fixed phase relations obtainable with the present invention. Two additional teachings are made by this invention to achieve its fixed-phase relations, and both must be satisfied. They are:

(1) The outputs of the prior circuits must be combined in the manner taught herein; and
(2) The components in both prior circuits must be proportioned in the particular manner taught herein.

The inputs to networks 10 and 20 are obtained from a source which provides a pair of oppositely phased voltages E and —E, which have equal magnitudes and a frequency $f$. These voltages are provided at terminals 7 and 8 with respect to ground or any common potential level. Any of many known types of 180 degree phase-splitting circuits can provide input voltages E and —E.

Network 10 has inputs connected directly to terminals 7 and 8. But network 20 has one input connected between terminal 7 and ground and has another input connected between ground and a point 9 on a voltage-divider network comprised of resistor R and $$\left(\frac{1-k}{k}\right)R$$

which produce a voltage ratio $k$. Thus the voltage at point 9 is a fraction $k$ of the input voltage $-E$ received at terminal 8 and is thus $-kE$.

First type network 10 provides a pair of output voltages $V_1$ and $W_1$ with respect to ground or any other common potential level. The phase $\phi_1$ between voltages $V_1$ and $W_1$ varies with frequency in the manner shown by curve 11 in Figure 4.

On the other hand, second type network 20 provides output voltages $V_2$ and $W_2$ with respect to ground. The phase $\phi_2$ between voltages $V_2$ and $W_2$ varies in the manner shown by curve 12 in Figure 5.

I have discovered how the networks 10 and 20 can be interrelated so that respective phase deviations from $90°$ of $\phi_1$ and $\phi_2$ may be made equal in magnitude and opposite in sign, and how the outputs of networks 10 and 20 can be combined so that the phase errors cancel and a pair of output voltages $E_v$ and $W_w$ maintain a fixed 90 degree phase difference without regard to frequency, subject only to the limitation that the magnitude of $E_v$ and $E_w$ become progressively more unbalanced as the frequency deviates more and more widely from the design center valve.

A pair of adder circuits 13 and 14 have inputs which are directly connected or can be cross-connected to outputs from networks 10 and 20. Adder circuits 13 and 14 vectorially combine their inputs in resistive networks to provide output voltages $E_v$ and $E_w$. Thus adder 13 sums equal-magnitude voltages $V_1$ and $V_2$ (or $W_1$) to provide output $E_v$. Similarly, adder 14 sums the equal-magnitude voltage $W_1$ (or $V_2$) and $W_2$ to provide output $E_w$.

Figure 2 is a vector diagram illustrating the manner in which the output voltages of networks 10 and 20 are combined to produce the adder output voltages $E_v$ and $E_w$. The geometrical proof that voltages $E_v$ and $E_w$ are always 90% apart follows: angle $\Delta$ represents the error by which the angle between $V_1$ and $V_2$ is less than $90°$ and also by which the angle between $W_1$ and $W_2$ is greater than $90°$. This common aspect of error angle $\Delta$ and also the fact that $V_1$ and $W_1$ coincide are attributes of the invention and will be proven later.

The voltages $V_1$ and $V_2$ are equal in magnitude. Thus their vector sum $E_v$ is represented by a vector which bisects the angle $\phi_1$ between $V_1$ and $V_2$. Hence, $$\frac{\phi_1}{2} = \frac{1}{2}(90° - \Delta)$$

Similarly, $W_1$ and $W_2$ are equal in magnitude, and the vector representing their sum bisects the angle $\phi_2$ between them, so that $$\frac{\phi_2}{2} = \frac{1}{2}(90° + \Delta)$$

Therefore, $$\frac{\phi_1}{2} + \frac{\phi_2}{2} = \frac{1}{2}(90° - \Delta) + \frac{1}{2}(90° + \Delta) = 90°$$

which is the angle between voltages $E_v$ and $W_w$. It is apparent that these voltages remain $90°$ apart regardless of the amount of the error angle $\Delta$ as long as this error angle maintains the characteristic of being common to the two sides of the circuit.

Figure 2 also shows that the magnitude of $E_v$ is greater than that of $E_w$ when the error angle $\Delta$ has the direction indicated. In this circuit, the phase angle between the output voltages $E_v$ and $E_w$ is constant and their relative magnitude varies somewhat with frequency. On the other hand in each component network, 10 or 20, the magnitudes of their output voltages are constant and the phase angle between the two voltages from one network varies with frequency. Since an unbalance of voltage magnitudes can be readily corrected by means well-known in the art, the advantage provided by this invention of holding the phase angle independent of frequency is unique and indispensable. Since the phase error $\Delta$ can be held to moderate values over a wide range of frequencies by the proper design of the component networks 10 and 20, the voltage unbalance between the two adder outputs $E_v$ and $E_w$ can also be held to a modest value over a wide frequency range. Thus far, there has been no teaching of how networks 10 and 20 may be constructed in order to maintain the errors in their output angles $\phi_1$ and $\phi_2$ equal in magnitude but opposite in sign, which is a condition for maintaining the required common value of error angle $\Delta$. Before this can be done, it is necessary that networks 10 and 20 be considered individually and in great detail. Reference is made to Figure 3 for this purpose.

In Figure 3, one well-known form of phase-splitter 30 is illustrated which serves the purpose of deriving voltages $E$ and $-E$ from an input signal provided at a single-ended input terminal 31. Equal resistors 33 and 34 are connected serially to the plate and cathode of a tube 32 between a direct-current source (B+) and ground. The oppositely-phased voltages $E$ and $-E$ are provided from the cathode and plate of tube 32 through equal capacitors 37 and 36 to terminals 7 and 8 respectively. The time constants of respective capacitor-resistor circuits are chosen to avoid any significant deviation from $180°$ of the phase angle between voltages $E$ and $-E$ over the required frequency range.

I. FIRST TYPE NETWORK

(A) *Structure and general analysis*

First type network 10 comprises resistors $R_1-R_6$ and capacitors $C_1-C_6$, all found within the broken line confining network 10 in Figure 3. It includes two branches each containing a pair of circuits in series between terminals 7 and 8. The first branch contains parallel items $R_1$ and $C_1$ in series with $R_3$ and $C_3$. The second branch contains parallel items $R_4$ and $C_4$ in series with items $R_6$ and $C_6$. The comparable items in the two branches are oppositely connected between terminals 7 and 8. Also parallel items $R_2$ and $C_2$ are connected between ground and a point 11 on the first branch; and parallel items $R_5$ and $C_5$ are connected between ground and a point 12 on the second branch. Component output voltages $V_1$ and $W_1$ of network 10 are taken between ground and respective points 11 and 12. Phase angle $\phi_1$ exists between $V_1$ and $W_1$.

Thus it is seen that $$\frac{V_1}{E} = \frac{(Z_3/Z_1) - 1}{1 + (Z_3/Z_1) + (Z_3/Z_2)} = \frac{Y_1 Z_3 - 1}{1 + Y_1 Z_3 + Y_2 Z_3} \quad (1)$$

where $Y_1 = G_1 + jB_1 = (1/R_1) + j\omega C_1$
$Y_2 = G_2 + jB_2 = (1/R_2) + j\omega C_2$
$Z_3 = R_3 - jX_3 = R_3 - j1/\omega C_3$ By substitution, (1) becomes $$\frac{V_1}{E} = \frac{R_3 G_1 + B_1 X_3 - 1 + j(R_3 B_1 - G_1 X_3)}{1 + R_3(G_1 + G_2) + X_3(B_1 + B_2) + j[R_3(B_1 + B_2) - X_3(G_1 + G_2)]} \quad (2)$$

It is necessary to impose conditions so that the absolute value of voltage ratio $V_1/E$ is independent of frequency. The first of these conditions is $$G_1/G_2 = B_1/B_2 \quad (3)$$

Now (2) becomes $$\frac{V_1}{E} = -\frac{G_1}{G_1 + G_2} \cdot \frac{1 - (R_3 G_1 + B_1 X_3) - j(R_3 B_1 - G_1 X_3)}{G_1/(G_1 + G_2) + (R_3 G_1 + B_1 X_3) + j(R_3 B_1 - G_1 X_3)} \quad (4)$$

The second condition is $$G_1/(G_1+G_2)=1-2(R_3G_1+B_1X_3) \quad (5)$$

With this condition, (4) becomes $$\frac{V_1}{E}=-\frac{G_1}{G_1+G_2}\frac{1-(R_3G_1+B_1X_3)-j(R_3B_1-G_1X_3)}{1-(R_3G_1+B_1X_3)+j(R_3B_1-G_1X_3)} \quad (6)$$

Now let $$k_A=\frac{G_1}{G_1+G_2}=\frac{R_2}{R_1+R_2} \quad (7)$$

$$X_1=\frac{R_3}{R_1}+\frac{C_1}{C_3} \quad (8)$$

$$y_1=\omega C_1 R_3 - 1/\omega C_3 R_1 \quad (9)$$

The two conditions, (3) and (5) become $$R_2/R_1=C_1/C_2 \quad (10)$$

$$\frac{R_2}{R_1+R_2}=1-2X_1=1-2\left(\frac{R_3}{R_1}+\frac{C_1}{C_3}\right) \quad (11)$$

The voltage ratio becomes $$\frac{V_1}{E}=-k_A\frac{1-X_1-jy_1}{1-X_1+jy_1} \quad (12)$$

In a similar manner, we may obtain $$\frac{W_1}{E}=k_B\frac{1-X_2-jy_2}{1-X_2+jy_2} \quad (13)$$

where $$k_B=\frac{R_5}{R_4+R_5} \quad (14)$$

$$X_2=\frac{R_6}{R_4}+\frac{C_4}{C_6} \quad (15)$$

$$y_2=\omega C_4 R_6 - 1/\omega C_6 R_4 \quad (16)$$

The conditions which must be imposed to make the magnitude of the voltage ratio $$\frac{W_1}{E}$$

independent of frequency are $$R_5/R_4=C_4/C_5 \quad (17)$$

$$\frac{R_5}{R_4+R_5}=1-2X_2=1-2\left(\frac{R_6}{R_4}+\frac{C_4}{C_6}\right) \quad (18)$$

The last two equations are analogous to (10) and (11). We can make $V_1$ and $W_1$ equal in magnitude and independent of frequency by letting $$k=k_A=k_B \quad (19)$$

This leads to the further condition $$R_2/R_1=R_5/R_4 \quad (20)$$

As a result, we also get $$X_1=X_2 \quad (21)$$

The phase angle between output and input voltages $V_1$ and $E$ is $$\theta_{v1}=-2\arctan\frac{y_1}{1-X_1}+\pi \quad (22)$$

and the phase angle between voltages $W_1$ and $E$ is $$\theta_{w1}=-2\arctan\frac{y_2}{1-X_1} \quad (23)$$

The phase angle between voltages $V_1$ and $W_1$ is $$\phi_1=\theta_{v1}-\theta_{w1}=2\left(\arctan\frac{y_2}{1-X_1}-\arctan\frac{y_1}{1-X_1}+\pi\right) \quad (24)$$

We may obtain $$\tan\frac{\phi_1}{2}=\frac{(1-X_1)^2+y_1y_2}{(1-X_1)(y_1-y_2)} \quad (25)$$

$$\frac{d\phi_1}{d\omega}=2\left[\frac{1-X_1}{(1-X_1)^2+y_2^2}\frac{dy_2}{d\omega}-\frac{1-X_1}{(1-X_1)^2+y_1^2}\frac{dy_1}{d\omega}\right] \quad (26)$$

For the sake of simplicity, the following are defined:

$$A_a=R_1C_3 \quad (27)$$

$$B_a=R_3C_1 \quad (28)$$

$$C_a=R_4C_6 \quad (29)$$

$$D_a=R_6C_4 \quad (30)$$

$$F_a=1-X_1=1-\left(\frac{R_3}{R_1}+\frac{C_1}{C_3}\right) \quad (31)$$

With this substitution, we have $$y_1=\omega B_a-1/\omega A_a \quad (32)$$

$$y_2=\omega D_a-1/\omega C_a \quad (33)$$

$$\tan\frac{\phi_1}{2}=\frac{F_a^2+(\omega B_a-1/\omega A_a)(\omega D_a-1/\omega C_a)}{F_a(\omega B_a-\omega D_a-1/\omega A_a+1/\omega C_a)} \quad (34)$$

$$\frac{d\phi_1}{d\omega}=2F_a\left[\frac{D_a+1/\omega^2 C_a}{F_a^2+(\omega D_a-1/\omega C_a)^2}-\frac{B_a+1/\omega^2 A_a}{F_a^2+(\omega B_a-1/\omega A_a)^2}\right] \quad (35)$$

(B) *General parametric analysis for first type network*

If $\phi_1$ is assumed to be fixed, then Equation 34 become a fourth-degree equation in $\omega$. It has at most four real roots. These correspond to the four possible values of frequency at which the assumed value of $\phi_1$ (i.e., a design value $\phi_{A1}$) is obtained. A curve of $\phi_1$ versus $\omega$ (which is $2\pi f$) should have two maxima and one minimum, or two minima and one maximum (see Figure 4). At minimum and maximum points on the curve $d\phi_1/d\omega=0$. If (35) is set equal to zero, a third-degree equation in $\omega^2$ results. The three positive roots in $\omega$ correspond to the three constant-phase points mentioned. One of these roots, $\omega_0$, comes at the geometric center of the useful band. The other two are symmetrically spaced about this midband frequency. We assume that the phase error at the band center is of one sign, and that the error at the other two constant-phase points is equal in magnitude to that at midband but opposite in sign. In this way, equal positive and negative errors result, and thereby first type network 10 is adapted to this invention.

The midband angular frequency $\omega_0$ is most easily found by setting (26) equal to zero and noting that the equation is satisfied when $y_2=-y_1$ and $dy_2/d\omega=dy_1/d\omega$ That is, $$\omega_0 D_a-1/\omega_0 C_a=1/\omega_0 A_a-\omega_0 B_a \quad (36)$$

$$D_a+1/\omega_0^2 C_a=B_a+1/\omega_0^2 A_a \quad (37)$$

Simultaneous solution of (36) and (37) yields $$\omega_0^2=1/B_a C_a=1/A_a D_a \quad (38)$$

We thus obtain a parametric condition for the invention $$R_3 R_4 C_1 C_6=R_1 R_6 C_3 C_4=1/\omega_0^2 \quad (39)$$

When this root, $\omega^2-\omega_0^2$, is eliminated from the equation $d\phi_1/d\omega=0$, there results $$(\omega/\omega_0)^4-[\omega_0^2 A_a C_a F_a^2-(A/C)_a-(C/A)_a-4](\omega/\omega_0)^2+1=0 \quad (40)$$

The positive roots of (40) correspond to the other two constant-phase points on the curve. Let the smaller of the roots be designated $\omega_1$.

$$(\omega_1/\omega_0)^2=\frac{1}{2}(N-\sqrt{N^2-4}) \quad (41)$$

where $$N=\omega_0^2 A_a C_a F_a^2-(A/C)_a-(C/A)_a-4 \quad (42)$$

The next step is to substitute $\omega_0$ in (34), find the corresponding value of $\phi_1$, then substitute $\omega_1$ and again find the corresponding value of $\phi_1$. The design value of $\phi_1$ ($=\phi_{A1}$) is chosen midway between these two values. Equation 34 may first be converted to the form $$\tan\frac{\phi_1}{2} = \frac{(\omega/\omega_0)^4 + [\omega_0^2 A_a C_a F_a^2 - (A/C)_a - (C/A)_a](\omega/\omega_0)^2 + 1}{\omega_0 F_a(A_a - C_a)(\omega/\omega_0)[1+(\omega/\omega_0)^2]}$$

$$= \frac{(\omega/\omega_0)^4 + (N+4)(\omega/\omega_0)^2 + 1}{\omega_0 F_a(A_a - C_a)(\omega/\omega_0)[1+(\omega/\omega_0)^2]} \quad (43)$$

The phase angle $\phi_1$ at midband (designated $\phi_{01}$) is obtained by setting $\omega/\omega_0$ equal to 1:

$$\tan\frac{\phi_{01}}{2} = \frac{N+6}{2\omega_0 F_a(A_a - C_a)} \quad (44)$$

The phase angle $\phi_1$ at the other two constant-phase points (designated $\phi_{a1}$ or $\phi_{b1}$) is obtained by substituting (41) in (43):

$$\tan\frac{\phi_{a1}}{2} = \frac{2\sqrt{N+2}}{\omega_0 F_a(A_a - C_a)} \quad (45)$$

The design value $\phi_{A1}$ is then $$\phi_{A1} = \frac{\phi_{01} + \phi_{a1}}{2} \quad (46)$$

$$\tan\phi_{A1} = \omega_0 F_a(A_a - C_a)\frac{N/2 + 3 + 2\sqrt{N+2}}{\omega_0^2 F_a^2(A_a - C_a)^2 - (N+6)\sqrt{N+2}} \quad (47)$$

It is convenient to use the ratio $\omega_1/\omega_0$ as an intermediate design parameter, and for this purpose it is designated $$X = \omega_1/\omega_0 \quad (48)$$

This ratio is a measure of the bandwidth of network 10. From (41):

$$N = X^2 + 1/X^2 \quad (49)$$

Further, let $$Q_a = \omega_0 F_a(A_a - C_a) \quad (50)$$

$$S_1 = \frac{N+6}{2} = \frac{1}{2}(X^2 + 1/X^2) + 3 \quad (51)$$

$$S_2 = 2\sqrt{N+2} = 2(X + 1/X) \quad (52)$$

Then (47) becomes $$\tan\phi_{A1} = Q_a\frac{S_1 + S_2}{Q_a^2 - S_1 S_2} \quad (53)$$

Equation 53 may now be solved for $Q_a$:

$$Q_a = \frac{S_1 + S_2}{2\tan\phi_{A1}} \pm \sqrt{\left(\frac{S_1 + S_2}{2\tan\phi_{A1}}\right)^2 + S_1 S_2} \quad (54)$$

The plus sign is to be used for positive values of $\phi_{A1}$ and the minus sign for negative values of $\phi_{A1}$. Thus it is possible to determine $Q_a$ when $\phi_{A1}$ and $X$ are given.

It is found that $Q_a = \pm\sqrt{S_1 S_2}$ when $\phi_{A1}$ is $\pm 90°$, which is the condition required in this invention. Therefore, $Q_a$ is entirely a function of the bandwidth parameter $X$.

From (50), we may solve for $\omega_0 F_a$ and substitute in (42):

$$N = \frac{Q_a^2}{(A/C)_a - 2 + (C/A)_a} - (A/C)_a - (C/A)_a - 4 \quad (55)$$

This may be solved for the ratio $(C/A)_a$:

$$(C/A)_a = a/2 \pm \sqrt{(a/2)^2 - 1} \quad (56)$$

where $$a = \sqrt{\left(\frac{N}{2} + 3\right)^2 + Q_a^2} - \left(\frac{N}{2} + 1\right) \quad (57)$$

or, for the case where $\phi_{A1} = \pm 90°$, $$a = \sqrt{S_1^2 + S_1 S_2} - (S_1 - 2) \quad (57a)$$

Thus, $a$ and therefore $(C/A)_a$ are functions only of the bandwidth parameter $X$. In (56), the minus sign is to be used for positive values of $\phi_{A1}$ and the plus sign for negative values of $\phi_{A1}$.

A solution may now be carried out for the circuit parameters, but the design is not yet optimum. It is still necessary to apply one more initial requirement. This is the maximizing of the voltage ratio $k$. The simplest procedure is to assume a value for the parameter $C_a$ and solve for the rest:

$$A_a = C_a(A/C)_a \quad (58)$$

$$B_a = 1/\omega_0^2 C_a \quad (59)$$

$$D_a = (C/A)_a(1/\omega_0^2 C_a) \quad (60)$$

$$F_a = \frac{Q_a}{\omega_0 C_a[(A/C)_a - 1]} \quad (61)$$

We now assume a value for the circuit parameter $R_4$ and begin solving for the others. The results are as follows:

$$R_5 = R_4\frac{2F_a - 1}{2(1 - F_a)} \quad (62)$$

$$R_6 = \frac{R_4}{2}[1 - F_a \pm \sqrt{(1-F_a)^2 - 4(D/C)_a}]$$

$$= \frac{R_4}{2}[1 - F_a \pm \sqrt{(1-F_a)^2 - 4(C/A)_a(1/\omega_0^2 C_a^2)}] \quad (63)$$

$$C_4 = \frac{C_a}{2R_4}[1 - F_a \mp \sqrt{(1-F_a)^2 - 4(D/C)_a}]$$

$$= \frac{C_a}{2R_4}[1 - F_a \mp \sqrt{(1-F_a)^2 - 4(C/A)_a(1/\omega_0^2 C_a^2)}] \quad (64)$$

$$C_5 = C_4\frac{2(1 - F_a)}{2F_a - 1}$$

$$= \frac{C_a}{R_4}\frac{1 - F_a}{2F_a - 1}[1 - F_a \mp \sqrt{(1-F_a)^2 - 4(C/A)_a(1/\omega_0^2 C_a^2)}] \quad (65)$$

$$C_6 = C_a/R_4 \quad (66)$$

In order that $R_6$, $C_4$, and $C_5$ may be realizable, the quantity under the radical must be zero or positive. That is, $(1-F_a)^2 \geq 4(C/A)_a(1/\omega_0^2 C_a^2)$. Since $k = 1 - 2(1-F_a)$ and $k$ should be as large as possible $(1-F_a)$ must be as small as possible. Hence $$(1-F_a)^2 = 4(C/A)_a(1/\omega_0^2 C_a^2) \quad (67)$$

When (67) is solved simultaneously with (61), the result is $$\omega_0 C_a = \frac{Q_a}{(A/C)_a - 1} + 2\sqrt{(C/A)_a} = \sqrt{(C/A)_a}\left(\frac{Q_a}{\sqrt{(A/C)_a} - \sqrt{(C/A)_a}} + 2\right) \quad (68)$$

This specifies a unique value for $C_a$. The corresponding value of $k$ is found to be $$k = \frac{2}{1 + (2/Q_a)(\sqrt{(A/C)_a} - \sqrt{(C/A)_a})} - 1 \quad (69)$$

Hence, for $\phi_{A1} = \pm 90°$, $k$ is solely a function of the bandwidth parameter $X$.

(C) *Final parametric analysis of first type network*

Equations 62-66 now become $$R_5 = R_4\frac{k}{1-k} \quad (70)$$

$$R_6 = R_4\frac{1-k}{4} \quad (71)$$

$$C_4 = \frac{C_a}{R_4}\frac{1-k}{4} \tag{72}$$

$$C_5 = \frac{C_a}{R_4}\frac{(1-k)^2}{4k} \tag{73}$$

$$C_6 = C_a/R_4 \tag{66}$$

Since the two sides of the network are wholly independent, another circuit parameter may be chosen arbitrarily. Let this be $R_1$. The remaining circuit parameters are found to be $$R_2 = R_1\frac{k}{1-k} \tag{74}$$

$$R_3 = R_1\frac{1-k}{4} \tag{75}$$

$$C_1 = \frac{C_a}{R_1}\left(\frac{A}{C}\right)_a\left(\frac{1-k}{4}\right) \tag{76}$$

$$C_2 = \frac{C_a}{R_1}\left(\frac{A}{C}\right)_a\frac{(1-k)^2}{4k} \tag{77}$$

$$C_3 = \frac{C_a}{R_1}\left(\frac{A}{C}\right)_a \tag{78}$$

It is seen that $$R_1C_1 = R_2C_2 = R_3C_3 = C_a\left(\frac{A}{C}\right)_a\left(\frac{1-k}{4}\right) \tag{79}$$

$$R_4C_4 = R_5C_5 = R_6C_6 = C_a\left(\frac{1-k}{4}\right) \tag{80}$$

It is usually convenient to let $R_1 = R_4$. Then $R_2 = R_5$, $R_3 = R_6$, $C_1 = (A/C)_a C_4$, $C_2 = (A/C)_a C_5$, $C_3 = (A/C)_a C_6$ The maximum deviation from the desired phase angle taken at midband is $$(\phi_D)_a = \frac{\phi_{01} - \phi_{a1}}{2} = \arctan\frac{S_1}{Q_a} - \arctan\frac{S_2}{Q_a} \tag{81}$$

$$\tan(\phi_D)_a = Q_a\left(\frac{S_1 - S_2}{Q_a^2 + S_1 S_2}\right) \approx (\phi_D)_a \text{ (radians)} \tag{82}$$

For the case where $\phi_{A1}$ has the desired value of $\pm 90°$, the deviation is given by $$\tan(\phi_D)_a = \frac{1}{2}\left(\frac{S_1 - S_2}{\sqrt{S_1 S_2}}\right) \tag{82a}$$

Again, this is a function solely of the bandwidth parameter X. For computational purposes, (43) may be written $$\tan\frac{\phi_1}{2} = \frac{(\omega/\omega_0)^4 + 2(S_1-1)(\omega/\omega_0)^2 + 1}{Q_a(\omega/\omega_0)[1 + (\omega/\omega_0)^2]} \tag{83}$$

A typical curve of $\phi_1$ versus frequency is shown in Figure 4.

In order to find the useful bandwidth, it is necessary to determine the angular frequency $\omega_2$ at which the phase deviation is numerically equal to that at $\omega_0$ and $\omega_1$. In other words, we need to solve for the angular frequencies at which $$\tan\frac{\phi_1}{2} = S_1/Q_a$$

When (83) is written as a polynomial in $\omega$, we get $$(\omega/\omega_0)^4 - S_1(\omega/\omega_0)^3 + 2(S_1-1)(\omega/\omega_0)^2 - S_1(\omega/\omega_0) + 1 = 0 \tag{84}$$

When the double root at $\omega/\omega_0 = 1$ is divided out, there remains $$(\omega/\omega_0)^2 - (S_1-2)(\omega/\omega_0) + 1 = 0 \tag{85}$$

The solution of this equation yields reciprocal roots which define the edges of the useful band. The lower one of these is given by $$\omega_2/\omega_0 = (S_1/2) - 1 - \sqrt{[(S_1/2)-1]^2 - 1} \tag{86}$$

The bandwidth of first type network 10 expressed as a ratio is $$\frac{\omega_3}{\omega_2} = \frac{(S_1/2) - 1 + \sqrt{[(S_1/2)-1]^2 - 1}}{(S_1/2) - 1 - \sqrt{[(S_1/2)-1]^2 - 1}}$$

$$= [(S_1/2) - 1 + \sqrt{[(S_1/2)-1]^2 - 1}]^2 \tag{87}$$

whence $$S_1 = \sqrt{\omega_3/\omega_2} + \sqrt{\omega_2/\omega_3} + 2 \tag{88}$$

Also $$X = \sqrt{z - \sqrt{z^2 - 1}} \tag{89}$$

where $$Z = \sqrt{\omega_3/\omega_2} + \sqrt{\omega_2/\omega_3} - 1 \tag{90}$$

It is seen that the bandwidth of network 10 is a unique function of X and that the use of X as a design parameter is justified. Figure 4 illustrates how X is related to the bandwidth in a typical instance.

II. SECOND TYPE NETWORK

(A) Structure and general analysis

Second type network 20 comprises resistors $R_1$–$R_4$ and capacitors $C_1$–$C_4$. These components are all found within the broken line surrounding network 20. Network 20 includes two branches connected similarly between terminals 7 and 9. A first branch comprises parallel items $R_1$ and $C_1$ in series with items $C_2$ and $R_2$. A second branch comprises parallel items $R_4$ and $C_4$ in series with items $R_3$ and $C_3$. Component output voltages $V_2$ and $W_2$ of network 20 are taken between ground and points 21 and 22 of the respective branches. Phase angle $\phi_2$ exists between voltages $V_2$ and $W_2$.

The procedure is similar to that used with network 10 in deriving equations for network 20, wherein the quantities $X_1$, $X_2$, $Y_1$ and $Y_2$ are defined for comparable components of the branches of network 20 in the same manner as they are defined for the branches of network 10 by Equations 8, 9, 15 and 16. We obtain first for network 20:

$$\frac{V_2}{E} = k\frac{1 + X_1 - jy_1}{1 + X_1 + jy_1} \tag{91}$$

$$\frac{W_2}{E} = k\frac{1 + X_1 - jy_2}{1 + X_1 + jy_2} \tag{92}$$

where $$X_1 = \frac{R_2}{R_1} + \frac{C_1}{C_2} = \frac{R_3}{R_4} + \frac{C_4}{C_3} \tag{93}$$

$$k = \frac{1}{1 + 2X_1} \tag{94}$$

$$Y_1 = R_2\omega C_1 - 1/R_1\omega C_2 \tag{95}$$

$$Y_2 = R_3\omega C_4 - 1/R_4\omega C_3 \tag{96}$$

The magnitude of each output voltage, $V_2$ or $W_2$, is independent of frequency and is equal to $kE$. The phase angles of $V_2/E$ and $W_2/E$ are $$\theta_{v2} = -2\arctan\frac{y_1}{1 + X_1} \tag{97}$$

$$\theta_{w2} = -2\arctan\frac{y_2}{1 + X_1} \tag{98}$$

The phase difference is $$\phi_2 = \theta_{v2} - \theta_{w2} = 2\left(\arctan\frac{y_2}{1+X_1} - \arctan\frac{y_1}{1+X_1}\right) \tag{99}$$

We now have $$\tan\frac{\phi_2}{2}=\frac{(1+X_1)(y_2-y_1)}{(1+X_1)^2+y_1y_2} \quad (100)$$

$$\frac{d\phi_2}{d\omega}=2\left[\frac{1+X_1}{(1+X_1)^2+y_2^2}\frac{dy_2}{d\omega}-\frac{1+X_1}{(1+X_1)^2+y_1^2}\frac{dy_1}{d\omega}\right] \quad (101)$$

Again, for the sake of simplicity, we let $$A_b=R_1C_2 \quad (102)$$
$$B_b=R_2C_1 \quad (103)$$
$$C_b=R_4C_3 \quad (104)$$
$$D_b=R_3C_4 \quad (105)$$
$$F_b=1+X_1 \quad (106)$$

This allows us to write $$y_1=\omega B_b-1/\omega A_b \quad (107)$$
$$y_2=\omega D_b-1/\omega C_b \quad (107)$$

$$\tan\frac{\phi_2}{2}=\frac{F_b(\omega D_b-1/\omega C_b-\omega B_b+1/\omega A_b)}{F_b^2+(\omega B_b-1/\omega A_b)(\omega D_b-1/\omega C_b)} \quad (109)$$

$$\frac{d\phi_2}{d\omega}=2F_b\left[\frac{D_b+1/\omega^2 C_b}{F_b^2+(\omega D_b-1/\omega C_b)^2}-\frac{B_b+1/\omega^2 A_b}{F_b^2+(\omega B_b-1/\omega A_b)^2}\right] \quad (110)$$

It is seen that Equation 110 is identical with (35) for first type network 10. Furthermore, Equation 109 may be compared with (34) to show that the right member of one is the negative reciprocal of the right member of the other. This allows shortening the parametric analysis.

(B) *General parametric analysis for second type network*

In the same manner as with network 10, we obtain for network 20:

$$\omega_0^2=1/B_bC_b=1/A_bD_b \quad (111)$$

We thus obtain the design condition $$R_2R_4C_1C_3=R_1R_3C_2C_4=1/\omega_0^2 \quad (112)$$

Equations 40, 41 and 42 thus apply also to network 20. In the following, angle $\phi_{02}$ designates the value of $\phi_2$ at midband (where $\phi_2$ is a minimum), and $\phi_{a2}$ or $\phi_{b2}$ designates the value of $\phi_2$ at the other constant-phase points (where $\phi_2$ is a maximum), as shown in Figure 5. Equations 43, 44, and 45 may be applied to the second type network provided that $$\tan\frac{\phi_1}{2} \text{ is replaced by } -\cot\frac{\phi_2}{2}$$

Hence, for network 20

$$\tan\frac{\phi_{a2}}{2}=\frac{2\omega_0 F_b(C_b-A_b)}{N+G} \quad (113)$$

$$\tan\frac{\phi_{a2}}{2}=\frac{\omega_0 F_b(C_b-A_b)}{2\sqrt{N+2}} \quad (114)$$

It is now found that Equations 46–57 are applicable to network 20 when the appropriate change of subscript is made. Thus all the basic parametric equations are the same for networks 10 and 20. Thus from (54) it is seen that $$Q_b=\pm\sqrt{S_1S_2} \quad (114a)$$

If we now assume that $C_b$ and $R_4$ are known as before, we obtain the following equations for several of the circuit parameters:

$$R_3=(R_4/2)[F_b-1\pm\sqrt{(F_b-1)^2-4(D/C)_b}]$$
$$=(R_4/2)[F_b-1$$
$$\pm\sqrt{(F_b-1)^2-4(C/A)_b(1/\omega_0^2C_b^2)}] \quad (115)$$

$$C_3=C_b/R_4 \quad (116)$$
$$C_4=(C_b/2R_4)[F_b-1\pm\sqrt{(F_b-1)^2-4(D/C)_b}]$$
$$=(C_b/2R_4)[F_b-1$$
$$\pm\sqrt{(F_b-1)^2-4(C/A)_b(1/\omega_0^2C_b^2)}] \quad (117)$$

In order that $R_3$ and $C_4$ may be realizable, the quantity under the radical must be zero or positive, i.e., $$(F_b-1)^2\geq 4(C/A)_b(1/\omega_0^2C_b^2)$$

Since $$k=\frac{1}{1+2(F_b-1)}$$

and $k$ should be as large as possible, $(F_b-1)$ must be as small as possible. Hence $$(F_b-1)^2=4(C/A)_b(1\omega_0^2C_b^2) \quad (118)$$

Equations 58–61 may be applied with a suitable change of subscript, provided that $\omega_0$ is the same for the two networks. We now solve (118) and (61) simultaneously:

$$\omega_0 C_b=\frac{Q_b}{(A/C)_b-1}$$
$$-2\sqrt{(C/A)_b}=\sqrt{(C/A)_b}\left(\frac{Q_b}{\sqrt{(A/C)_b}-\sqrt{(C/A)_b}}-2\right) \quad (119)$$

This identifies a unique value for $C_b$. It is found that $k$ is given again by Equation 69. The voltage ratio $k$ must of course, be the same for the two networks, since the invention requires that the two component networks have equal output voltages.

(C) *Final parametric analysis of second type network*

Equations 115–117 now become $$R_3=R_4\left(\frac{1-k}{4k}\right) \quad (120)$$

$$C_3=C_b/R_4 \quad (116)$$

$$C_4=\frac{C_b}{R_4}\left(\frac{1-k}{4k}\right) \quad (121)$$

On the other side of the network, we may arbitrarily assume $R_1$. The remaining circuit parameters are then found to be $$R_2=R_1\left(\frac{1-k}{4k}\right) \quad (122)$$

$$C_1=\frac{C_b}{R_1}\left(\frac{A}{C}\right)_b\left(\frac{1-k}{4k}\right) \quad (123)$$

$$C_2=\frac{C_b}{R_1}\left(\frac{A}{C}\right)_b \quad (124)$$

It is seen that $$R_1C_1=R_2C_2=C_b\left(\frac{A}{C}\right)_b\left(\frac{1-k}{4k}\right) \quad (125)$$

$$R_3C_3=R_4C_4=C_b\left(\frac{1-k}{4k}\right) \quad (126)$$

It is usually convenient to let $R_1=R_4$. Then $R_2=R_3$, $$C_2=\left(\frac{A}{C}\right)_b C_3, \quad C_1=\left(\frac{A}{C}\right)_b C_4$$

The maximum deviation of $\phi_2$ from the desired value $\phi_{A2}$ is $$(\phi_D)_b=\frac{\phi_{02}-\phi_{a2}}{2}=\arctan\left(-\frac{Q_b}{S_1}\right)-\arctan\left(-\frac{Q_b}{S_2}\right) \quad (127)$$

$$=\arctan\frac{Q_b}{S_2}-\arctan\frac{Q_b}{S_1} \quad (127a)$$

so that $$\tan (\phi_D)_b = Q_b\left(\frac{S_1+S_2}{Q_b^2+S_1S_2}\right) \quad (128)$$

For the case where $\phi_{A2}=\pm 90°$, as required by the invention, Equation 128 becomes $$\tan (\phi_D)_b = \frac{1}{2}\left(\frac{S_1-S_2}{\sqrt{S_1S_2}}\right) \quad (128a)$$

Hence in the invention, the same angular deviation is obtained for both types of networks 10 and 20; see Equation 82a.

III. THE COMBINATION OF THE FIRST AND SECOND NETWORKS

Each prior network has phase variations within its bandwidth, as can be seen from Figures 4 and 5. However, through the appropriate combination of the output voltages of two properly proportioned component networks by means of adders, these phase variations are eliminated.

The form of adder circuit indicated as 13 or 14 in Figure 3 is preferable to the form shown in Figure 1, because the resistive networks tend to load the phase-shift networks 10 or 20 and no provision is made in the design for such loading. Thus in Figure 3, each adder 13 or 14 is a pair of triodes connected as cathode followers and having a common load resistor 43 or 53. In adder 13, the grids of tubes 41 and 42 are connected to voltage outputs $V_1$ and $V_2$ respectively of networks 10 and 20. Likewise in adder 14, the grids of tubes 51 and 52 are connected to voltage outputs $W_1$ and $W_2$ respectively of networks 10 and 20. The final outputs $E_v$ and $E_w$, having a constant 90 degree phase difference regardless of frequency, are taken across respective load resistors 43 and 53.

Since it is necessary for the invention that the phase error $(\phi_D)_a$ and $(\phi_D)_b$ be equal but of opposite sign in the two types of network, it is seen by comparing (82) and (128) that $$Q_b = -Q_a \quad (129)$$

Thus, the rule for signs given after Equation 54 must be reversed for network 20. At the same time, the rule for signs following Equation 56 must be reversed, so that $$(C/A)_b = (A/C)_a \quad (130)$$

This is necessary in order to have Equation 69 yield the same value of $k$ for both networks.

For computational purposes, Equation 109 may be written $$\tan \frac{\phi_2}{2} = -\frac{Q_D(\omega/\omega_0)[1+(\omega/\omega_0)^2]}{(\omega/\omega_0)^4+2(S_1-1)(\omega/\omega_0)^2+1} \quad (131)$$

Inspection of (83) and (131) shows that, in view of (129), the angle $\phi/2$ varies symmetrically in opposite directions from 45° for networks 10 and 20. The bandwidth Equations 86–90 must apply similarly to network 20, as may be appreciated from an inspection of Figures 4 and 5. Thus, the inventive combination requires that the parameter $k$ be the same for both networks 10 and 20 and that the ratio $(A/C)_a$ and $(A/C)_b$ be reciprocally related. Once $k$, $A/C$ and $C$ have been found for each network from the expressions in Sections I and II, any two of the resistors and capacitors in each network 10 or 20 may be assumed and the remaining parameters calculated from Equations 70–78 for network 10 and from Equations 120–124 for network 20.

The procedure which follows completes the proof, begun earlier in the discussion of Figure 2, that the phase difference between output voltages $E_v$ and $E_w$ remains constant as the common error angle $\Delta$ varies. First, the phase angles $\theta$ for the output voltages $V_1$, $W_1$, $V_2$ and $W_2$ of networks 10 and 20 with respect to input voltage E are expressed in terms of system parameters, and then it is shown that the summations by adder circuits 13 and 14 give the constant 90 degree phase difference. The parameters $Q_a$ and $(C/A)_a$ for network 10 and $Q_b$ and $(C/A)_b$ for network 20 are defined similarly, as stated earlier after Equation 114.

The first step is to derive the expressions for the phase angles $\theta_{V1}$, $\theta_{V2}$, $\theta_{W1}$, and $\theta_{W2}$ measured with respect to input voltage E, for the voltages $V_1$, $V_2$, $W_1$ and $W_2$ at the outputs of networks 10 and 20.

(A) Network 10

The angles $\theta_{V1}$ and $\theta_{W1}$ are the respective phase angles between the voltages $V_1$, $W_1$ and the input voltage E.

From (22)

$$\frac{\theta_{v1}}{2} = \frac{\pi}{2} - \arctan\frac{y_1}{1-X_1}$$

From (23)

$$\frac{\theta_{w1}}{2} = -\arctan\frac{y_2}{1-X_1}$$

Hence, $$\tan\frac{\theta_{v1}}{2} = \frac{1-X_1}{y} = \frac{F_a}{\omega B_a - 1/\omega A_a} = \frac{F_a}{(\omega/\omega_0^2 C_a)-1/\omega A_a} \quad (132)$$

$$= \frac{\omega_0^2\omega A_a C_a F_a}{\omega^2 A_a - \omega_0^2 C_a} = \frac{(\omega/\omega_0)(\omega_0 C_a F_a)}{(\omega/\omega_0)^2-(C/A)_a} \quad (132a)$$

$$\tan\frac{\theta_{w1}}{2} = -\frac{y_2}{1-X_1} = \frac{(1/\omega C_a)-\omega D_a}{F_a} = \frac{(1/\omega C_a)-\omega/\omega_0^2 A_a}{F_a} \quad (133)$$

$$= \frac{\omega_0^2 A_a - \omega^2 C_a}{\omega_0^2 \omega A_a C_a F_a} = \frac{1-(\omega/\omega_0)^2(C/A)_a}{(\omega/\omega_0)(\omega_0 C_a F_a)} \quad (133a)$$

From (67)

$$1-F_a = 2\sqrt{C/A}_a(1/\omega_0 C_a) \quad (67)$$

$$F_a = 1-2\sqrt{C/A}_a(1/\omega_0 C_a) \quad (67a)$$

$$\omega_0 C_a F_a = \omega_0 C_a - 2\sqrt{(C/A)_a} \quad (67b)$$

Substitute for $\omega_0 C_a$ from (68):

$$\omega_0 C_a F_a = \frac{Q_a}{(A/C)_a - 1}$$

Substitute this in (132a) and (133a):

$$\tan\frac{\theta_{v1}}{2} = \frac{Q_a(\omega/\omega_0)}{[(A/C)_a-1](\omega/\omega_0)^2+(C/A)_a-1} \quad (132b)$$

$$\tan\frac{\theta_{w1}}{2} = \frac{[(C/A)_a-1](\omega/\omega_0)^2+(A/C)_a-1}{Q_a(\omega/\omega_0)} \quad (133b)$$

(B) Network 20

The angles $\theta_{V2}$ and $\theta_{W2}$ are the respectively phase angles between the voltages $V_2$, $W_2$ and the input voltage E.

From (97)

$$\frac{\theta_{v2}}{2} = -\arctan\frac{y_1}{1+X_1}$$

From (98)

$$\frac{\theta_{w2}}{2} = -\arctan\frac{y_2}{1+X_1}$$

Hence, $$\tan\frac{\theta_{v2}}{2} = -\frac{y_1}{1+X_1} = \frac{(1/\omega A_b)-\omega B_b}{F_b} = \frac{(1/\omega A_b)-\omega/\omega_0^2 C_b}{F_b} \quad (134)$$

$$= \frac{\omega_0^2 C_b - \omega^2 A_b}{\omega_0^2 \omega A_b C_b F_b} = \frac{(C/A)_b-(\omega/\omega_0)^2}{(\omega/\omega_0)(\omega_0 C_b F_b)} \quad (134a)$$

$$\tan\frac{\theta_{w2}}{2}=-\frac{y_2}{1+X_1}=\frac{(1/\omega C_b)-\omega D_b}{F_b}=\frac{(1/\omega C_b)-\omega/\omega_0^2 A_b}{F_b} \quad (135)$$

$$=\frac{\omega_0^2 A_b-\omega^2 C_b}{\omega_0^2 \omega A_b C_b F_b}=\frac{1-(\omega/\omega_0)^2(C/A)_b}{(\omega/\omega_0)(\omega_0 C_b F_b)} \quad (135a)$$

From (118)
$$F_b-1=2\sqrt{(C/A)_b}(1/\omega_0 C_b)$$
$$F_b=1+2\sqrt{(C/A)_b}(1/\omega_0 C_b) \quad (118a)$$
$$\omega_0 C_b F_b=\omega_0 C_b+2\sqrt{(C/A)_b}$$

Substitute for $\omega_0 C_b$ from (119):

$$\omega_0 C_b F_b=\frac{Q_b}{(A/C)_b-1}$$

Substitute this in (134a) and (135a):

$$\tan\frac{\theta_{v2}}{2}=-\frac{[(A/C)_b-1](\omega/\omega_0)^2+(C/A)_b-1}{Q_b(\omega/\omega_0)} \quad (134b)$$

$$\tan\frac{\theta_{w2}}{2}=\frac{[(C/A)_b-1](\omega/\omega_0)^2+(A/C)_b-1}{Q_b(\omega/\omega_0)} \quad (135b)$$

It has been shown previously that networks 10 and 20 must be designed so that $$Q_b=-Q_a$$
$$(C/A)_b=(A/C)_a$$

(See Equations 129, 130.) When these replacements are made in (134b) and (135b), we get $$\tan\frac{\theta_{v2}}{2}=\frac{[(C/A)_a-1](\omega/\omega_0)^2+(A/C)_a-1}{Q_a(\omega/\omega_0)} \quad (134c)$$

$$\tan\frac{\theta_{w2}}{2}=-\frac{[(A/C)_a-1](\omega/\omega_0)^2+(C/A)_a-1}{Q_a(\omega/\omega_0)} \quad (135c)$$

Comparison of Equations (132b) and (135c) shows that one is the negative reciprocal of the other. This means that $\theta_{V1}/2$ and $\theta_{W2}/2$ differ by 90°, or that $\theta_{V1}$ and $\theta_{W2}$ differ by 180°. Comparison of Equations (133b) and (134c) shows them to be identical. Hence $\theta_{V2}$ and $\theta_{W1}$ are equal. This confirms the construction of Figure 2, in which vectors $V_1$ and $W_2$ are drawn 180° apart, and vectors $V_2$ and $W_1$ are drawn coincident. As explained earlier in this disclosure, the phase relations displayed in Figure 2 insure that the voltages $E_v$ and $E_w$ are always 90° out of phase.

Inspection of Figure 2 shows that $$90°-\Delta=\phi_1 \quad (136)$$
$$90°+\Delta=\phi_2 \quad (137)$$

The angles $\theta_1$ and $\theta_2$ may be determined from (83) and (131) respectively. If in (131) $Q_b$ is replaced by $-Q_a$, the two equations give reciprocal results for the half-angles. This is consistent with (136) and (137):

$$\tan\frac{\phi_1}{2}=\tan\left(45°-\frac{\Delta}{2}\right)=\cot\left(45°+\frac{\Delta}{2}\right)=\cot\frac{\phi_2}{2} \quad (138)$$

Equation (138) can be solved for $$\tan\frac{\Delta}{2}=\frac{1-\tan\frac{\phi_1}{2}}{1+\tan\frac{\phi_1}{2}} \quad (139)$$

Substitute (83) in (139):

$$\tan\frac{\Delta}{2}=\frac{Q_a(\omega/\omega_0)[1+(\omega/\omega_0)^2]-[(\omega/\omega_0)^4+2(S_1-1)(\omega/\omega_0)^2+1]}{Q_a(\omega/\omega_0)[1+(\omega/\omega_0)^2]+[(\omega/\omega_0)^4+2(S_1-1)(\omega/\omega_0)^2+1]} \quad (140)$$

The error angle $\Delta$ varies with frequency in the same manner as $\phi_2$ (see Equation 137). This is shown in Figure 5, where $$\Delta=\phi_{a2}-\phi_{A2}=\phi_{A2}-\phi_{o2}$$

The maximum value of $\Delta$ is most easily determined by setting $\omega/\omega_0=1$, $Q_a=\sqrt{S_1 S_2}$ in (140) and reversing the sign to give a positive value:

$$\left(\tan\frac{\Delta}{2}\right)_{max}=\frac{S_1-\sqrt{S_1 S_2}}{S_1+\sqrt{S_1 S_2}} \quad (141)$$

Since $$\tan 2z=\frac{2}{\cot z-\tan z}$$

this leads to $$(\tan\Delta)_{max}=\frac{S_1-S_2}{2\sqrt{S_1 S_2}} \quad (142)$$

which is the same result obtained for the absolute magnitude of $\tan\phi_D$ (see Equation 82a).

Since the vectors $V_1$, $V_2$, $W_1$ and $W_2$ in Figure 2 are all the same length, it is a simple matter to derive an expression for the voltage unbalance between $E_v$ and $E_w$. When $$\Delta=0$$
$$E_v=E_w=\sqrt{2}V_1 \quad (143)$$

In the general case depicted in Figure 2, $$E_v=\sqrt{\cos^2\Delta+(1+\sin\Delta)^2}V_1$$
$$=\sqrt{2(1+\sin\Delta)}V_1=2V_1\cos\frac{90°-\Delta}{2}$$
$$=\sqrt{2}V_1\left(\cos\frac{\Delta}{2}+\sin\frac{\Delta}{2}\right) \quad (144)$$

$$E_w=\sqrt{\cos^2\Delta+(1-\sin\Delta)^2}V_1$$
$$=\sqrt{2(1-\sin\Delta)}V_1=2V_1\sin\frac{90°-\Delta}{2}$$
$$=\sqrt{2}V_1\left(\cos\frac{\Delta}{2}-\sin\frac{\Delta}{2}\right) \quad (145)$$

The ratio of the larger to the smaller output voltage is $$\frac{E_v}{E_w}=\frac{\cos\frac{\Delta}{2}+\sin\frac{\Delta}{2}}{\cos\frac{\Delta}{2}-\sin\frac{\Delta}{2}}=\frac{1+\tan\frac{\Delta}{2}}{1-\tan\frac{\Delta}{2}} \quad (146)$$

With the help of (141), we find the maximum unbalance within the band:

$$\left(\frac{E_v}{E_w}\right)_{max}=\sqrt{\frac{S_1}{S_2}} \quad (147)$$

In terms of the bandwidth parameter X, this becomes $$\left(\frac{E_v}{E_w}\right)_{max}=\frac{1}{2}\sqrt{\frac{X^4+6X^2+1}{X^3+X}} \quad (148)$$

As the bandwidth approaches zero, X approaches 1, and $(E_v/E_w)$ max approaches 1.

For small values of $\Delta$, Equations (144) and (145) may be approximated as follows:

$$E_v\approx\sqrt{2}V_1\left(1+\frac{\sin\Delta}{2}\right) \quad (149)$$
$$\approx\sqrt{2}V_1\left(1+\frac{\Delta}{2}\right)(\Delta\text{ in radians})$$

$$E_w\approx\sqrt{2}V_1\left(1-\frac{\sin\Delta}{2}\right) \quad (150)$$
$$\approx\sqrt{2}V_1\left(1-\frac{\Delta}{2}\right)(\Delta\text{ in radians})$$

These equations show that amplitude variations in $E_v$ or $E_w$ have the essentially same dependence upon frequency as $\Delta$, which in turn varies in the same manner as $\phi$. Hence, the nature of the variation of the magnitude of the output voltage, $E_v$ or $E_w$, is shown in Figure 4 or Figure 5.

When the input voltage is sinusoidal, an automatic amplitude regulation scheme may be incorporated in the invention to hold the output voltages $E_v$ and $E_w$ constant. The regulating circuit is readily made aperiodic, so that essentially constant voltages are obtained at all frequencies. The most familiar example of such regulation is the automatic gain control incorporated in most radio receivers and in some audio amplifiers. When the input voltage is complex, as in the case of wide-band speech or musical signals, simple automatic amplitude regulation is not practical. If great stability of output voltage balance is required in such a case, a more complex network of resistors and reactors is required than that shown as 10 or 20 in Figure 3.

To illustrate the foregoing derivations, assume that an embodiment of the invention is required to cover a frequency range of 100 c.p.s. to 10,000 c.p.s. and to produce two quadrature voltages of equal and constant amplitude (as nearly as possible without automatic amplitude regulation). Let $E_v$ lead $E_w$, so that $\phi_A = 90°$.

FOR NETWORK 10

From (90): $Z = \sqrt{100} + \sqrt{0.01} - 1 = 9.1$
From (89):

$$X = \sqrt{9.1 - \sqrt{9.1^2 - 1}} = 0.23476$$

From (51) or (88): $S_1 = 12.1$
From (52): $S_2 = 8.9888$
From (49) or (51): $N = 18.2$
From (54): $Q_a = \sqrt{S_1 S_2} = 10.429$
From (57): $a = 5.8742$
From (56): $(C/A)_a = (a/2) - \sqrt{(a/2)^2 - 1} = 0.1755$; $(A/C)_a = 5.6987$
From (68):

$$\omega_0 C_a = 3.0573$$

$C_a = \omega_0 C_a / \omega_0 = 3.0573 / (2\pi \times 1000) = 4.866 \times 10^{-4}$ From (69): $k = 0.4519$
From (79): $R_1 C_1 = R_2 C_2 = R_3 C_3 = 3.800 \times 10^{-4}$
From (80): $R_4 C_4 = R_5 C_5 = R_6 C_6 = 6.668 \times 10^{-5}$ Now let $R_1 = R_4 = 10,000$ ohms. Then from Equations 70–78, the circuit parameters for network 10 are found to be:

| Ohms | Microfarads |
|---|---|
| $R_1 = 10,000$ | $C_1 = 0.0380$ |
| $R_2 = 8,245$ | $C_2 = 0.0461$ |
| $R_3 = 1,370$ | $C_3 = 0.2773$ |
| $R_4 = 10,000$ | $C_4 = 0.00667$ |
| $R_5 = 8,245$ | $C_5 = 0.00809$ |
| $R_6 = 1,370$ | $C_6 = 0.0487$ |

From (81): $(\phi_D)_a = 8°29'$. This is the maximum departure of the phase angle between $V_1$ and $W_1$ from $90°$.

FOR NETWORK 20

$Z$, $X$, $S_1$, $S_2$, $N$, $Q^2$, and $a$ remain as before.

From (54): $Q_b = -\sqrt{S_1 S_2} = -10.429$
From (56): $(C/A)_b = (a/2) + \sqrt{(a/2)^2 - 1} = 5.6987$; $(A/C)_b = 0.1755$
From (119):

$$\omega_0 C_b = 7.874$$

$C_b = \omega_0 C_b / \omega_0 = 7.874 / (2\pi \times 1000) = 1.2532 \times 10^{-3}$ From (69): $k = 0.4519$
From (125): $R_1 C_1 = R_2 C_2 = 6.668 \times 10^{-5}$
From (126): $R_3 C_3 = R_4 C_4 = 3.800 \times 10^{-4}$ Again let $R_1 = R_4 = 10,000$ ohms. Then from Equations 120–124, the circuit parameters for network 20 are found to be:

| Ohms | Microfarads |
|---|---|
| $R_1 = 10,000$ | $C_1 = 0.00667$ |
| $R_2 = 3,032$ | $C_2 = 0.0220$ |
| $R_3 = 3,032$ | $C_3 = 0.1253$ |
| $R_4 = 10,000$ | $C_4 = 0.0380$ |

The maximum phase deviation $(\phi_D)_b$ is the same as for network 10 (see Equation 127). This is also the maximum value of the angle $\Delta$ shown in Figure 2 (see Equation 142).

From (147): $(E_v/E_w)_{max} = 1.1602$.

Although this invention has been described with respect to particular embodiments thereof, it is not to be so limited, as changes and modifications may be made therein which are within the full intended scope of the invention as defined by the appended claims.

What we claim is:

1. A broad-band resistance-capacitance phase-shift network, comprising a first-type network, having first and second input terminals, and first and second outputs, a first resistance and a first capacitance connected in parallel between said first input terminal and said first output, a second resistance and capacitance connected in parallel between ground and said first output, third resistance and capacitance connected in series between said first output, and said second input terminal, a fourth resistance and capacitance connected in parallel between said second output and said second input terminal, a fifth resistance and capacitance connected in parallel between ground and said second output, a sixth resistance and capacitance connected in series between said second output and said first input terminal; a second-type network having first and second inputs, and first and second outputs, said first input being connected to said first input terminal, a resistive voltage divider connected between said second input and said second input terminal, said voltage divider providing an attenuated voltage to said second-type network, a first capacitance and resistance connected in parallel between said first output and said second input, a second resistance and capacitance connected in series between said first output and said first input terminal, a third resistance and capacitance connected in series between said second output and said first input terminal, a fourth resistance and capacitance connected in parallel between said second output terminal and said second input; a first voltage combiner having a pair of inputs and an output, with said combiner inputs being respectively connected to the first outputs of said first and second type networks; a second voltage combiner having a pair of inputs and an output; the inputs of said second combiner being respectively connected to the second outputs of said first and second type networks, and the outputs of siad first and second combiners being capable of providing voltages phased by $90°$.

2. A network as defined in claim 1, in which said voltage divider comprises a pair of resistors connected in series between ground and said second input terminal, a point between said resistors being connected to said second input of said second-type network, said pair of resistors having a ratio of $$\frac{1-k}{k}$$

3. A network as defined in claim 2, comprising a phase-splitter receiving an input signal, said phase-splitter having a pair of outputs providing voltages of equal magnitude and opposite phase, the outputs of said phase-splitter being connected to said first and second input terminals.

4. A network, as defined in claim 2, in which said first through sixth resistances for said first network are $R_1$, $R_2$, $R_3$, $R_4$, $R_5$ and $R_6$ respectively, and its first through sixth capacitances are $C_1$, $C_2$, $C_3$, $C_4$, $C_5$ and $C_6$, respectively; said resistances and capacitances of said first-type network have the following relationship:

$$R_3R_4C_1C_6=R_1R_6C_3C_4=1/\omega_0^2$$

Where $\omega_0$ is the center frequency for both said first and second type networks; said second-type network having first through fourth resistances $R_1$, $R_2$, $R_3$, and $R_4$, respectively, and having first through fourth capacitances $C_1$, $C_2$, $C_3$, and $C_4$ respectively, said resistances and capacitances of said second-type network being related as follows:

$$R_2R_4C_1C_3=R_1R_3C_2C_4=1/\omega_0^2$$

5. A network, as defined in claim 2, in which said first and second-type networks each have center frequency $\omega_0$ and have a respective minimum or maximum frequency $\omega_1$, said circuits being defined in terms of the ratio $$\frac{\omega_1}{\omega_0}=X$$

with the assistance of the following parameters $S_1$, $S_2$, and Q, $a$ and $$\frac{C}{A},$$

$k$, $C_a$ and $C_b$, which are defined as follows:

$$S_1=\frac{1}{2}\left[\left(\frac{\omega_1}{\omega_0}\right)^2+\left(\frac{\omega_0}{\omega_1}\right)^2\right]+3$$

$$S_2=2\left(\frac{\omega_1}{\omega_0}+\frac{\omega_0}{\omega_1}\right)$$

$$Q_a=\pm\sqrt{S_1S_2}$$

$$a=\sqrt{S_1^2+S_1S_2}-(S_1-2)$$

$$\left(\frac{C}{A}\right)_a=\frac{a}{2}\pm\sqrt{(a/2)^2-1}$$

$$k=\frac{2}{1+\left(\frac{2}{Q_a}\right)\left(\sqrt{(A/C)_a}-\sqrt{(C/A)_a}\right)}-1$$

$$C_a=\frac{1}{\omega_0}\left[\frac{Q_a}{(A/C)_a-1}+2\sqrt{(C/A)_a}\right]$$

$$C_b=\frac{1}{\omega_0}\left[\frac{Q}{(C/a)-1}-2\sqrt{(C/A)_a}\right]$$

The first through sixth resistances of said first-type network being $R_1$, $R_2$, $R_3$, $R_4$, $R_5$ and $R_6$, and its first through sixth capacitances being $C_1$, $C_2$, $C_3$, $C_4$, $C_5$ and $C_6$, with the values of $R_1$ and $R_4$ being given, and the values of the remaining resistances and capacitances of said first-type network being:

$$R_2=R_1\left(\frac{k}{1-k}\right)$$

$$R_3=R_1\left(\frac{1-k}{4}\right)$$

$$C_3=\frac{C_a}{R_1}\left(\frac{A}{C}\right)_a$$

$$C_2=C_3\frac{(1-k)^2}{4k}$$

$$C_1=C_3\left(\frac{1-k}{4}\right)$$

$$R_5=R_4\left(\frac{k}{1-k}\right)$$

$$R_6=R_4\left(\frac{1-k}{4}\right)$$

$$C_4=C_6\left(\frac{1-k}{4}\right)$$

$$C_5=C_6\left[\frac{(1-k)^2}{4k}\right]$$

$$C_6=\frac{C_a}{R_4}$$

The first through fourth resistances for the second-type network being $R_1$, $R_2$, $R_3$, and $R_4$, respectively, and its first through fourth capacitances being $C_1$, $C_2$, $C_3$, and $C_4$ respectively, the values of $R_1$ and $R_4$ being given for the second-type network, its other resistances and capacitances having the following values:

$$R_3=R_4\left(\frac{1-k}{4k}\right)$$

$$C_3=\frac{C_b}{R_4}$$

$$C_4=C_3\left(\frac{1-k}{4k}\right)$$

$$R_2=R_1\left(\frac{1-k}{4k}\right)$$

$$C_1=C_2\left(\frac{1-k}{4k}\right)$$

$$C_2=\frac{C_b}{R_1}\left(\frac{C}{A}\right)_a$$

6. A network as defined in claim 5 in which for the first-type network $$R_1=R_4$$
$$R_2=R_5$$
$$R_3=R_6$$

$$C_1=\left(\frac{A}{C}\right)C_4$$

$$C_2=\left(\frac{A}{C}\right)C_5$$

$$C_3=\left(\frac{A}{C}\right)C_6$$

and for the second type network:

$$R_1=R_4$$
$$R_2=R_3$$

$$C_2=\left(\frac{C}{A}\right)_a C_3$$

$$C_1=\left(\frac{C}{A}\right)_a C_4$$

References Cited in the file of this patent

UNITED STATES PATENTS

| | | |
|---|---|---|
| 2,529,117 | Tompkins | Nov. 7, 1950 |
| 2,559,662 | Rheingold et al. | July 10, 1951 |
| 2,763,830 | Pihl | Sept. 18, 1956 |